Figure 1:
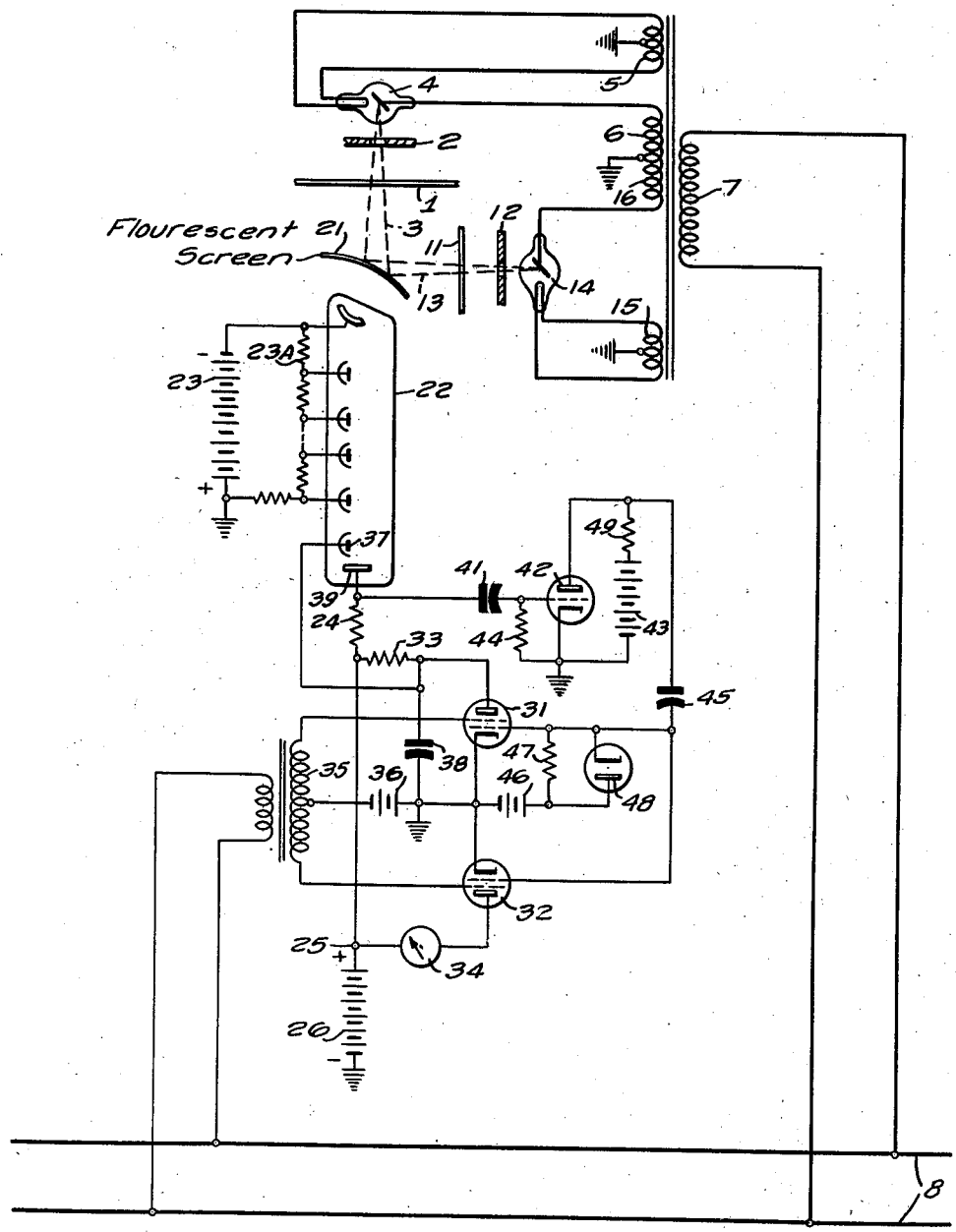

June 20, 1950

FITZ-HUGH B. MARSHALL ET AL 2,512,355

X-RAY THICKNESS GAUGE

Filed June 30, 1947

WITNESSES:

INVENTORS
Fitz-Hugh B. Marshall
and John W. Coltman.
BY
F. W. Lyle.
ATTORNEY

Patented June 20, 1950

2,512,355

UNITED STATES PATENT OFFICE 2,512,355

X-RAY THICKNESS GAUGE

Fitz-Hugh B. Marshall, Glenshaw, and John W. Coltman, Pittsburgh, Pa., assignors to Westinghouse Electric Corporation, East Pittsburgh, Pa., a corporation of Pennsylvania Application June 30, 1947, Serial No. 758,014

25 Claims. (Cl. 250—83.3)

Our invention relates to X-ray devices and, in particular, relates to arrangements for employing X-rays to measure the thickness of sheet materials.

In many cases where materials, such as steel, for example, are being rolled or otherwise produced in the form of sheets or strips, it is necessary to gage continuously the thickness of the material being turned out in order to insure uniformity of the product. While mechanical thickness gages have been used, they have many undesirable properties and limitations. They almost invariably have to make contact with the material, and this may mark or mar it; or they may be difficult to use because of high temperature of the material; or they may strictly limit the speed with which the material may be turned out of the producing apparatus. Since the absorption of X-rays increases with the thickness of a given material, attempts have been made to gage thickness of sheet material being turned out by machines by irradiating them with a beam of X-rays and measuring the amount of X-ray absorption.

There are likewise many instances where, even with materials of uniform thickness, it is desirable to determine whether the composition or other pertinent properties of the material are uniform from point to point therein; and in many instances, the absorption of X-rays passing through the material may be employed for this purpose.

However, difficulty has been found in the development of apparatus thus employing X-rays in providing an incident X-ray beam which is not subject to such variations in intensity and wave length from time to time as would seriously interfere with the accuracy of the absorption measurements. Unless the voltage employed to generate the X-rays and the temperature of the X-ray tube cathode are maintained constant to an extremely high degree of precision, considerable apparent variations in the absorptions for a given thickness of metal are found. For example, we have found that a 1% change in the voltage applied between the X-ray tube anode and the cathode will result in an error of some 3% in the indicated thickness of the absorbing material on which the X-rays are incident and similar large errors result from changes of the same order of magnitude in the current through the X-ray tube filament. Variations causing even greater errors occur in certain other components of the apparatus previously tried.

We have found that the errors due to variations of the type just mentioned may be eliminated by a system in which the intensity of X-rays transmitted through the sample is compared with the intensity of X-rays emanating from the same source, or a substantially identical source, which are transmitted through a standard body or sheet. In accordance with the embodiment of our invention described in detail herein, the above-mentioned method is carried out by irradiating the sample with an X-ray beam emanating from one X-ray tube during one half cycle of an alternating-current power supply, and irradiating a standard with X-rays emanating from an approximately identical X-ray tube energized from the same power supply during the other half cycle of the alternating voltage. This results in the production, during alternate half cycles of a power supply, of two different X-ray beams, one of which has been transmitted through the sample and the other of which has been transmitted through the standard. The two transmitted beams then act on a suitable intensity measuring device to produce output currents in alternate half cycles of the power supply which are, respectively, measures of the intensity of the two transmitted beams.

By a suitable electronic switching device, the sensitivity of the device measuring the intensity of the transmitted beams is varied by automatic volume control methods to produce substantially constant output current pulses from the measuring device during those half cycles of the power supply in which the measuring device responds to X-rays transmitted through the standard. As a result, the output current of the same measuring device during those half cycles in which it measures the X-rays transmitted through the sample is proportional to the ratio of the intensity of the X-rays transmitted through the sample to the intensity of the X-rays transmitted through the standard. This ratio is substantially the same for a given sample and a given standard, over a wide range of variations in anode voltage or filament voltage of the X-ray tubes, and is also substantially independent of any gradual variations or drift in the sensitivity and other characteristics of the measuring device itself. A system is thus obtained in which errors due to such variables as have been described in the preceding paragraphs are eliminated.

One object of our invention is, accordingly, to provide an arrangement for measuring the thickness of sheet and other materials by means of absorption of X-rays or other forms of radiation which is free from errors which have interfered with the accuracy of prior art measuring systems.

Another object of our invention is, accordingly, to provide a thickness measuring arrangement which may produce accurate measurements without physically contacting the material being gaged.

Another object of our invention is to provide a method of measuring the thickness of materials which is capable of accurate operation, even with materials which may be at extremely high temperatures.

Still another object of our invention is to provide an arrangement for measuring the absorption in a given material of X-ray and other forms of radiant energy in which the accuracy of the results is not vitiated by substantial variations in the electrical characteristics of the power systems supplying energy to the radiating source.

Still another object of our invention is to provide an arrangement for measuring the absorption of X-rays or other radiation in test materials which is substantially unaffected by variations in the characteristics of the radiation-measuring device employed as a component thereof.

Figure 2:
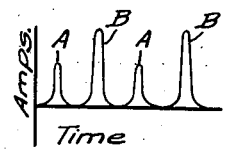

Other objects of our invention will become apparent upon reading the following description, taken in connection with the drawings, in which:

Figure 1 is a schematic diagram of one electrical circuit capable of embodying the principles of our invention; and Fig. 2 is a graph showing the variation with time of certain currents in the output circuit of an electrical radiation-meter forming a component of our system.

Referring in detail to Fig. 1, a material of which the thickness is to be measured, which may, for example, be a band 1 of sheet steel passing through the rolls 1A of a rolling mill, is arranged to pass continuously in front of a shield 2 having an aperture through which an X-ray beam 3 is being projected from an X-ray tube 4 of suitable type. The X-ray tube 4 has its cathode excited from a transformer winding 5 and has voltage impressed on its anode from a second transformer winding 6 which may be energized by a primary winding 7 supplied from a suitable alternating-current power source 8 (not shown). A standard specimen 11, which may, for example, be a piece of sheet steel having the thickness which it is desired to have the sheet 1 duplicate, is arranged to be held by a suitable support 11A and irradiated with X-rays through an aperture in a second shield 12 by an X-ray beam 13 from an X-ray tube 14 which is preferably, although not necessarily, a matched tube to the X-ray tube 4. The tube 14 has its cathode supplied from a secondary winding 15 and its anode supplied from a secondary winding 16. The windings 15 and 16 are matched with windings 5 and 6 respectively and energized likewise from the primary winding 7. An alternative arrangement may consist of separate transformers for the two tubes, providing the transformers are substantially alike and are energized from the same alternating-current power source.

The X-ray beams 3 and 13 are arranged to be coincident on a fluorescent screen 21, and a photo-sensitive tube 22 is arranged to be energized by the light emitted from the screen 21. We have found a very practical arrangement in having the photo-sensitive tube 22 consist in a photo-multiplier tube of which many suitable types are well known today in the tube art. Such a tube produces an amplification of the initial photo-current from the cathode by the successive ejection of secondary electrons from a series of electrodes called dynodes, one of which is labeled 37 in Fig. 1. As is well known, such tubes produce an output current of very substantial intensity, even when irradiated by relatively low intensity light. The amplification of the device may be varied by changing the voltage on one or more of the dynodes (e. g. dynode 37). The tube 22, as shown in the drawing, is purely symbolical, rather than a structural representation of such a photo-multiplier tube.

The photo-sensitive cathode of the tube 22 is preferably connected to the negative terminal of a voltage source 23 having its positive terminal grounded. A set of potential dividing resistors (23A) across the source 23 supplies each dynode except the last with a fixed voltage. This last dynode receives its voltage from the automatic amplification control system to be described below. The output anode of the tube 22 is connected through a suitable resistor 24 to the positive terminal 25 of a second voltage source 26 which has its negative terminal grounded. This arrangement is such that the resistor 24 is traversed by a current which is, from instant to instant, a replica of the intensity variations of the radiation incident upon the screen 21.

Since the voltage applied to the anodes of the X-ray tubes 4 and 14 is alternating, they irradiate the specimens 1 and 11, respectively, only during one-half cycle of the alternating-voltage supply 8. The transformer windings 6 and 16 are so poled that the anode of the X-ray tube 4 is positive during one-half cycle and the anode of the X-ray tube 14 is positive during the second half of each cycle. It will be seen to result from this that the beams 3 and 13, respectively, energize the photo-multiplier tube 22 during alternate half cycles of the source 8. The output current from tube 22, flowing through resistor 24, therefore, consists of a series of pulses, alternate members of the series, respectively, being proportional in amplitude to the intensity of the radiations transmitted through the sample 1 and the standard 11.

Fig. 2 illustrates the variation of the current through the resistor 24 with time, the pulses A being measures of the intensity of the transmitted radiation in beam 3 passing through the sample 1, and the pulses B being measures of the intensity of the radiation of the transmitted beam passing through the standard 11 on alternate half cycles of the power source 8.

The remainder of the circuit network now about to be described has the following two purposes: first, to impress gain control voltages on the photo-sensitive tube 22 of such character that the pulses B of current through resistor 24 as amplified and applied to the grid of control tube 31 are substantially always of the same amplitude regardless of any variations in absolute value of the transmitted radiation in beam 13 and also regardless of any variations from time to time in sensitivity of the photo-sensitive tube 22, or of the amplifier 42 which follows it; and, second, to produce on a meter 34 a deflection which is substantially proportional to the amplitude of pulses A. Since the amplitude of the pulses B is automatically held constant, this procedure is equivalent to measuring the ratio of the pulses A and B, a quantity which is substantially dependent only on the thicknesses of the sample and standard, and not to any appreciable degree on the strength or quality of the X-rays or sensitivity of the detector.

In order to separate the effect of the pulses A and B for control and measurement purposes, we provide a pair of grid-controlled tubes 31 and 32 having their cathodes grounded and their anodes connected, respectively, through a resistor 33 and a meter 34 to the positive terminal 25 of voltage source 26. Upon a pair of control electrodes in the tubes 31 and 32, we impress from a transformer secondary winding 35, having its mid point connected to ground through a suitable bias battery 36, a pair of switching voltages which alternately render the tubes 31 and 32 non-conductive on successive half cycles of the voltage source 8. The polarity is such that the tube 31 is conductive during those half cycles in which X-rays are being transmitted through the standard material 11 and the tube 32 is conductive during those half cycles of the source 8 in which the X-rays are being transmitted through the sample 1. The tube 31 is connected in shunt across a capacitor 38 which derives its voltage from the voltage source 26 through the resistor 33, and supplies the operating voltage for the gain control electrode 37 in the photo-sensitive tube 22; this operating voltage is adjusted during each alternate half cycle that tube 31 is conductive by discharge current through tube 31 in accordance with the signal strength impressed on the control grid of tube 31. The anode 39 of the photo-sensitive tube 22 is connected through a capacitor 41 to the control electrode of an amplifier tube 42 having its cathode grounded, and its anode is supplied with voltage through a resistor 49 from a direct-current voltage source 43. A resistor 44 is connected between the grid and cathode of tube 42. The anode of the tube 42 is connected through a capacitor 45 to the control electrodes of the tubes 31 and 32. The control electrodes of the tubes 31 and 32 are connected through a suitable bias battery 46 and a resistor 47 shunted by a rectifier 48 to the cathodes of tubes 31 and 32.

The purpose of the control tube 31 is to control the sensitivity of the photo-multiplier tube 22 in such a way as to maintain the amplitude of the pulses B which represent the strength of the X-rays transmitted through the sample 11, at a substantially constant value, in spite of any variations in the strength of the X-ray beam incident on the sample 11 or of any variations in the sensitivity of the photo-sensitive cell 22 due to changes in voltage sources or other causes. Thus, if for any reason the amplitude of the voltage pulses produced in resistor 24 by the transmitted X-ray beams increases, the control electrode of tube 42 drops in potential, thereby causing an increase in peak potential of the anode of tube 42 relative to ground. The control grid in tube 31, therefore, becomes more positive, thereby increasing current flow through the anode of that tube during its alternate conducting half cycles if the voltage pulses of increased amplitude produced in resistor 24 occur on those half cycles of the source 8 in which the sample 11 is being irradiated by tube 14. This causes the anode of tube 31 to draw increased current from the capacitor 38, thus decreasing its potential and consequently the positive potential of the gain control dynode 37 of photo-multiplier tube 22.

Accordingly, the gain of the photo-multiplier tube 22 is reduced, and the current increase through resistor 24 which produced the original change is counteracted. Since tubes 42 and 31, together with their attendant circuits, are designed to be extremely sensitive to small changes in voltage of their control electrodes, the net result is that the current flowing through resistor 24 during pulses B is reduced again nearly to the value it had before the above-mentioned corrective changes were set in action by current increase through resistor 24 during the B pulse phase.

It will be noted that the capacitor 38, connected between the gain control electrode 37 and ground, acquires its charge from the voltage source 26 through resistor 33, but is prevented from attaining the full source voltage by being periodically partially discharged by the current pulses through the control tube in accordance with the magnitude of pulses B as described above. The resistor 33 is so proportioned relative to capacitor 38 that, while this charge on capacitor 38 gradually rises through resistor 33 during the half cycle of source 8 on which tube 31 is rendered non-conductive by transformer secondary 35, the amount of this increase in the voltage of capacitor 38 is small. Thus the gain of the photo-multiplier tube 22 is set by the control tube 31 to hold the standard pulses B at a constant level, and the gain is substantially at this same value when the pulses A from the sample are being measured by means of tube 32.

Though the signal current flowing through the resistor 24 consists of a series of pulses which fall substantially to zero near the end of every half cycle of voltage of source 8, the use of capacitor coupling between the anode of photo-multiplier 22 and the amplifier tube 42 and likewise between the amplifier tube 42 and the control tubes 31 and 32, results in the loss of a base reference level. Since a capacitor cannot pass direct current, the voltage output of the capacitor 45 would, in the absence of the rectifier tube 48, consist of an alternation both positive and negative about a base line or zero level which would be determined by the areas and shapes of both pulses A and B. The rectifier 48, however, permits the passage to ground of current whenever its cathode is negative with respect to its anode, thus charging the condenser 45 to a direct-current potential such that the cathode of the rectifier 48 goes negative at the interval between pulses only by the very slight amount necessary to make up for the loss of charge through the resistor 47 during the positive swing of the pulse. Thus the voltage across the resistor 47 falls substantially to zero between pulses, and the voltages on the control grids of the tubes 31 and 32 during the pulses are essentially measured individually from the true zero level. Though the use of this base line restoring system is desirable, it may be omitted without introducing much change in scale reading, since the effect of sample pulses A on the apparent height of the standard pulses B always bears a functional relationship to the height of pulses A, and the net effect will be merely to change the scale calibration of the indicating meter.

It will be noted that while both the voltage pulses A and B from resistor 24 are impressed on the control electrode of tube 31, the latter is kept non-conductive by the action of transformer winding 35, except during those half periods of the alternating source 8 in which the standard 11 is being irradiated; hence it is only the voltage pulses B which are transmitted through the standard 11 which control the bias impressed on gain control electrode 37, and hence it is only voltage pulses B which control the sensitivity of photo-multiplier tube 22. On the other hand, the tube 32 is conducting only during the half cycle when pulses A, representing the response of the photo-multiplier tube to the X-rays transmitted by the sample being measured, are flowing. Hence the current flow from voltage source 26 through meter 34 is made to vary in accordance with the amplitude of the pulses A, and the meter may be calibrated in terms of the thickness (or density) of the sample sheet.

Various modifications of the particular arrangement which we have shown to illustrate an embodiment of our invention may, however, be made. Thus, while we have shown two X-ray tubes employed to irradiate the sample and the standard unit, respectively, it is possible to employ a single X-ray tube in which different portions of the same beam are used to irradiate the sample and the standard. For example, a mechanical shutter, such as a sector disk of lead, may shut off the portion of the X-ray beam irradiating the standard unit during one time interval and shut off the portion of the beam irradiating the sample during the remaining time interval. Or, alternatively, two separate fluorescent screen areas may be irradiated, respectively, by the portions of the beam transmitted through the standard unit and the sample, and a mechanical shutter be used to cut off the light from respective fluorescent areas from incidence upon the photo-sensitive cell during the alternate half cycles of the source 8.

Similarly, while the automatic gain control electrode has been located in the photo-multiplier tube, it is possible to apply this gain control voltage to a suitable amplifier stage introduced in that portion of the system which receives the output current of the photo-sensitive device. Furthermore, the photo-multiplier tube may, under appropriate circumstances, be replaced by other types of device having output currents responsive to the intensity of X-ray irradiation; for example, a Geiger counter, or an ionization chamber, the gain control being applied to an amplifier stage as above. In the particular embodiment which we have described, we have employed the device to measure the thickness of a sheet of material by measuring its transmission of X-rays; but it will be evident that the apparatus may be used to measure the variations in X-ray transparency of materials which may be due to other properties than their thickness. For example, the X-ray diffraction pattern of an unknown material might be compared, point by point, with a standard X-ray spectrum by employment of the principles of our invention.

We claim as our invention:

1. In an apparatus for measuring the radiation absorption of a material, a source of radiation, means for holding said material and a standard unit of material, means to irradiate said standard unit and said material alternately, measuring means to produce an output which is proportional to the intensity of radiation transmitted alternately through said standard unit and said material, sensitivity control means for said measuring means to make its response to the radiation transmitted by one of said materials invariable, and means for producing an output which is in accordance with the response of said measuring means to the radiation transmitted by the other said material.

2. In means for measuring the thickness of a material, a source of radiation, means for holding said material and a standard unit of material, means to irradiate said standard unit and said material alternately, measuring means to produce an output which is proportional to the intensity of radiation transmitted alternately through said standard unit and said material, sensitivity control means for said measuring means to make its response to the radiation transmitted by one of said materials invariable, and means for producing an output which is in accordance with the response of said measuring means to the radiation transmitted by the other said material.

3. In means for measuring the thickness of a material, a source of X-rays, means for holding said material and a standard unit of material, means to irradiate said standard unit and said material alternately, measuring means to produce an output which is proportional to the intensity of radiation transmitted alternately through said standard unit and said material, sensitivity control means for said measuring means to make its response to the radiation transmitted by one of said materials invariable, and means for producing an output which is in accordance with the response of said measuring means to the radiation transmitted by the other said material.

4. In means for measuring the thickness of a material, a source of X-rays, means for holding said material and a standard unit of material, means to irradiate said standard unit and said material alternately, measuring means to produce an output which is proportional to the intensity of radiation transmitted alternately through said standard unit and said material, sensitivity control means for said measuring means to make its response to the radiation transmitted on one of said alternate irradiations invariable, and means for indicating the magnitude of the response of said measuring means on the other of said alternate irradiations.

5. In means for measuring the thickness of a material, a source of X-rays, means for holding said material and a standard unit of material, an alternating current source to furnish power to said source of X-rays, means to cause X-rays from said source to traverse said standard unit on one-half cycle of said alternating current source and to traverse said material on the other half cycle thereof, measuring means to produce an output which is proportional to the intensity of radiation transmitted alternately through said standard unit and said material, sensitivity control means for said measuring means to make its response on one-half cycle of said alternating current source invariable, and means for producing an output which is in accordance with the response of said measuring means on the other half cycle of said alternating current source.

6. In means for measuring the thickness of a material, a source of X-rays, means for holding said material and a standard unit of material, an alternating current source to furnish power to said source of X-rays, means to cause X-rays from said source to traverse said standard unit on one-half cycle of said alternating current source and to traverse said material on the other half cycle thereof, measuring means to produce an output which is proportional to the intensity of radiation transmitted alternately through said standard unit and said material, sensitivity control means for said measuring means to make its response to X-rays traversing said standard unit invariable, and means for indicating the magnitude of the response of said measuring means to X-rays traversing said material.

7. In means for measuring the thickness of a material, means for holding said material and a standard unit of material, two substantially similar sources of X-rays, one irradiating said material to be measured and the other irradiating said standard material, a standard unit of material, an alternating current source to furnish power to said sources of X-rays alternately during successive half cycles thereof, measuring means to produce an output which is proportional to the intensity of radiation transmitted alternately through said standard unit and said material, sensitivity control means for said measuring means to make its response on one-half cycle of said alternating current source invariable, and means for producing an output which is in accordance with the response of said measuring means on the other half cycle of said alternating current source.

8. In means for measuring the thickness of a material, means for holding said material and a standard unit of material, two substantially similar sources of X-rays, one irradiating said material to be measured and the other irradiating said standard material, an alternating current source to furnish power to said source of X-rays alternately during successive half-cycles thereof, measuring means to produce an output which is proportional to the intensity of radiation transmitted alternately through said standard unit and said material, sensitivity control means for said measuring means to make its response to X-rays transmitted through said standard material invariable, and means for indicating the magnitude of the response of said measuring means to X-rays transmitted through said material.

9. In a device for measuring the radiation absorption of sheet material, a source of radiation, means for holding said material and a standard unit of material, means to irradiate said standard unit and said sheet material to be measured alternately, measuring means to produce an output which is proportional to the radiation transmitted through said standard unit and said sheet material to be measured, sensitivity control means for said measuring means to make its response to one of said alternate irradiations invariable, and means for producing an output which is in accordance with the response of said measuring means on the other of said alternate irradiations.

10. In a device for measuring the radiation absorption of sheet material, a source of radiation, means for holding said material and a standard unit of material, means to irradiate said standard unit and said sheet material to be measured alternately, measuring means to produce an output which is proportional to the radiation transmitted through said standard unit and said sheet material to be measured, sensitivity control means for said measuring means to make its response to one of said alternate irradiations invariable, and means for indicating the magnitude of the response of said measuring means to the other said alternate irradiation.

11. In a device for measuring the radiation absorption of sheet material, a source of X-rays, means for holding said material and a standard unit of material, means to irradiate said standard unit and said sheet material to be measured alternately, measuring means to produce an output which is proportional to the radiation transmitted through said standard unit and said sheet material to be measured, sensitivity control means for said measuring means to make its response to one of said alternate irradiations invariable, and means for producing an output which is in accordance with the response of said measuring means on the other of said alternate irradiations.

12. In a device for measuring the radiation absorption of sheet material, a source of X-rays, means for holding said material and a standard unit material, means to irradiate said standard unit and said sheet material to be measured alternately, measuring means to produce an output which is proportional to the radiation transmitted through said standard unit and said sheet material to be measured, sensitivity control means for said measuring means to make its response to the X-rays transmitted through said standard unit invariable, and means for indicating the magnitude of the response of said measuring means to the X-ray transmitted through said sheet material.

13. In a device for measuring the radiation absorption of sheet material, a first source of X-rays and a second source of X-rays substantially identical therewith, means for holding said material and a standard unit of material, means to irradiate said standard sheet and said sheet to be measured alternately from said sources of X-rays, measuring means to produce an output which is proportional to the radiation transmitted through said standard unit and said sheet to be measured, sensitivity control means for said measuring means to make its response to one of said alternate irradiations invariable, and means for producing an output which is in accordance with the response of said measuring means on the other of said alternate irradiations.

14. In a device for measuring the radiation absorption of sheet material, a first source of X-rays and a second source of X-rays substantially identical therewith, means for holding said material and a standard unit of material, means to irradiate said standard sheet and said sheet to be measured alternately from said sources of X-rays, measuring means to produce an output which is proportional to the radiation transmitted through said standard unit and said sheet to be measured, sensitivity control means for said measuring means to make its response to X-rays transmitted through said standard unit invariable, and means for indicating the magnitude of the response of said measuring means to X-rays transmitted through said sheet material.

15. In apparatus for measuring the radiation absorption of a material, a source of X-rays, means for holding said material and a standard unit of material, means to irradiate said standard unit and said material alternately, measuring means to produce an output proportional to the radiation transmitted by said material and said standard unit, sensitivity control means for said measuring means to make its response to one of said alternate irradiations invariable, and means for producing an output which is in accordance with the response of said measuring means on the other of said alternate irradiations.

16. In apparatus for measuring the radiation absorption of a material, a source of X-rays, means for holding said material and a standard unit of material, means to irradiate said standard unit and said material alternately, measuring means to produce an output proportional to the radiation transmitted by said material and said standard unit, sensitivity control means for said measuring means to make its response to one of said alternate irradiations invariable, and means for indicating the magnitude of the response of said measuring means on the other of said alternate irradiations.

17. In apparatus for measuring the radiation absorption of a material, a first source of X-rays and a second source of X-rays approximately identical therewith, means for holding said material and a standard unit of material, an alternating current source to energize said first source of X-rays and said second source of X-rays on alternate half cycles, measuring means to produce an output which is proportional to the radiation transmitted through said standard unit and said material on said alternate half cycles, a sensitivity control for said measuring means to make its response on one-half cycle of said alternating current source invariable, and means for producing an output which is in accordance with the response of said measuring means on the other half period of said alternating current source.

18. In apparatus for measuring the radiation absorption of a material, a first source of X-rays and a second source of X-rays approximately identical therewith, means for holding said material and a standard unit of material, an alternating current source to energize said first source of X-rays and said second source of X-rays on alternate half cycles, measuring means to produce an output which is proportional to the radiation transmitted through said standard unit and said material on said alternate half-cycles, a sensitivity control for said measuring means to make its response to X-rays transmitted through said standard unit invariable, and means for indicating the magnitude of the response of said measuring means to X-rays transmitted through said material.

19. The method of measuring the radiation absorption of a material which comprises the steps of irradiating it, and irradiating a standard material in alternate periods, measuring the respective radiation transmissions of said material and said standard material in said alternate periods, controlling the sensitivity with which the measurement is carried out so that the response of the measuring means to irradiation of one of said materials is invariable, and utilizing the response to the transmitted radiation through said other material.

20. The method of measuring the radiation absorption of a material which comprises irradiating said material with X-rays, irradiating a standard unit of material with approximately similar X-rays, said irradiations being carried out in periods which alternate with each other, measuring the intensity of the transmitted radiation during each of said sets of alternate periods, controlling the sensitivity with which said measurements are carried out so that the response of the measuring instrument to the transmitted radiation of one of said materials is invariable, and producing an output quantity which is in accordance with the response of said measuring means to the radiation transmitted by said other material.

21. The method of measuring the radiation absorption of a material which comprises irradiating said material with X-rays, irradiating a standard unit of material with approximately identical X-rays, the X-rays used in said irradiations being derived on alternate half cycles of an alternating current power source, measuring the radiation transmitted by said material on said alternating half cycles and controlling the sensitivity at which said measurements are carried out to make the response during one of said alternate half cycles invariable.

22. In an apparatus for measuring the radiation absorption of a material, a source of radiation, means for holding said material and a standard unit of material, means to irradiate said standard unit and said material, measuring means to produce a periodic output which is proportional in alternate periods to the intensity of radiation transmitted through said standard unit and said material, sensitivity control means for said measuring means to make its response to the radiation transmitted by one of said materials invariable, and means for producing an output which is in accordance with the response of said measuring means to the radiation transmitted by the other said material.

23. In means for measuring the thickness of a material, a source of radiation, means for holding said material and a standard unit of material, means for irradiating said standard unit and said material, measuring means to produce a periodic output which is proportional in alternate periods to the intensity of radiation transmitted through said standard unit and said material, sensitivity control means for said measuring means to make its response to the radiation transmitted by one of said materials invariable, and means for producing an output which is in accordance with the response of said measuring means to the radiation transmitted by the other said material.

24. In means for measuring the thickness of a material, a source of X-rays, means for holding said material and a standard unit of material, means to irradiate said standard unit and said material, measuring means to produce a periodic output which is proportional in alternate periods to the intensity of radiation transmitted through said standard unit and said material, sensitivity control means for said measuring means to make its response to the radiation transmitted by one of said materials invariable, and means for producing an output which is in accordance with the response of said measuring means to the radiation transmitted by the other said material.

25. The method of measuring the radiation absorption of a material which comprises the steps of irradiating it, and irradiating a standard material, measuring the respective radiation transmissions of said material and said standard material in alternate periods, controlling the sensitivity with which the measurement is carried out so that the response of the measuring means to irradiation of one of said materials is invariable, and utilizing the response to the transmitted radiation through said other material.

FITZ-HUGH B. MARSHALL.
JOHN W. COLTMAN.

REFERENCES CITED

The following references are of record in the file of this patent:

UNITED STATES PATENTS

| Number | Name | Date |
|---|---|---|
| 1,788,401 | Meagher | Jan. 13, 1931 |
| 2,181,568 | Kotowski et al. | Nov. 28, 1939 |
| 2,193,850 | Andrieu et al. | Mar. 19, 1940 |
| 2,225,741 | Guanella | Dec. 24, 1940 |
| 2,240,420 | Schnitzer | Apr. 29, 1941 |
| 2,264,725 | Shoupp et al. | Dec. 2, 1941 |
| 2,266,154 | Blumlein | Dec. 26, 1941 |
| 2,337,932 | Rogers | Dec. 28, 1943 |
| 2,370,692 | Shepherd | Mar. 6, 1945 |
| 2,401,404 | Bedford | June 4, 1946 |
| 2,412,423 | Rajchman et al. | Dec. 10, 1946 |
| 2,432,227 | Dailey et al. | Dec. 9, 1947 |

OTHER REFERENCES

Smith, General Electric Review, March 1945, vol. 48, pp. 13–17.